H. E. COBURN.
PASTEURIZING APPARATUS.
APPLICATION FILED MAR. 19, 1915.

1,244,704.

Patented Oct. 30, 1917.

WITNESSES:
Lawrence N. Genger.
Walter H. Kelley

INVENTOR.
Harry E. Coburn
BY
ATTORNEY

UNITED STATES PATENT OFFICE.

HARRY E. COBURN, OF BUFFALO, NEW YORK.

PASTEURIZING APPARATUS.

1,244,704.   Specification of Letters Patent.   Patented Oct. 30, 1917.

Application filed March 19, 1915. Serial No. 15,469.

*To all whom it may concern:*

Be it known that I, HARRY E. COBURN, a citizen of the United States of America, residing in the city of Buffalo, county of Erie, and State of New York, have invented certain new and useful Improvements in Pasteurizing Apparatus, of which the following is a full, clear, and exact description.

My device relates generally to pasteurizing apparatuses, and more particularly to an apparatus for pasteurizing milk.

One object of my invention has been to provide an apparatus in which milk, or other fluid being pasteurized may continuously pass through the apparatus while being treated.

Another object has been to provide a device in which the milk elements will not separate, since the milk does not remain stationary for any length of time.

Furthermore, my device is so constructed as to be thoroughly hygienic and provide for an easy and effective cleansing of all the parts thereof.

Referring to the accompanying drawings, forming part of this application, like characters of reference indicate like parts throughout the several views.

Figure 1:
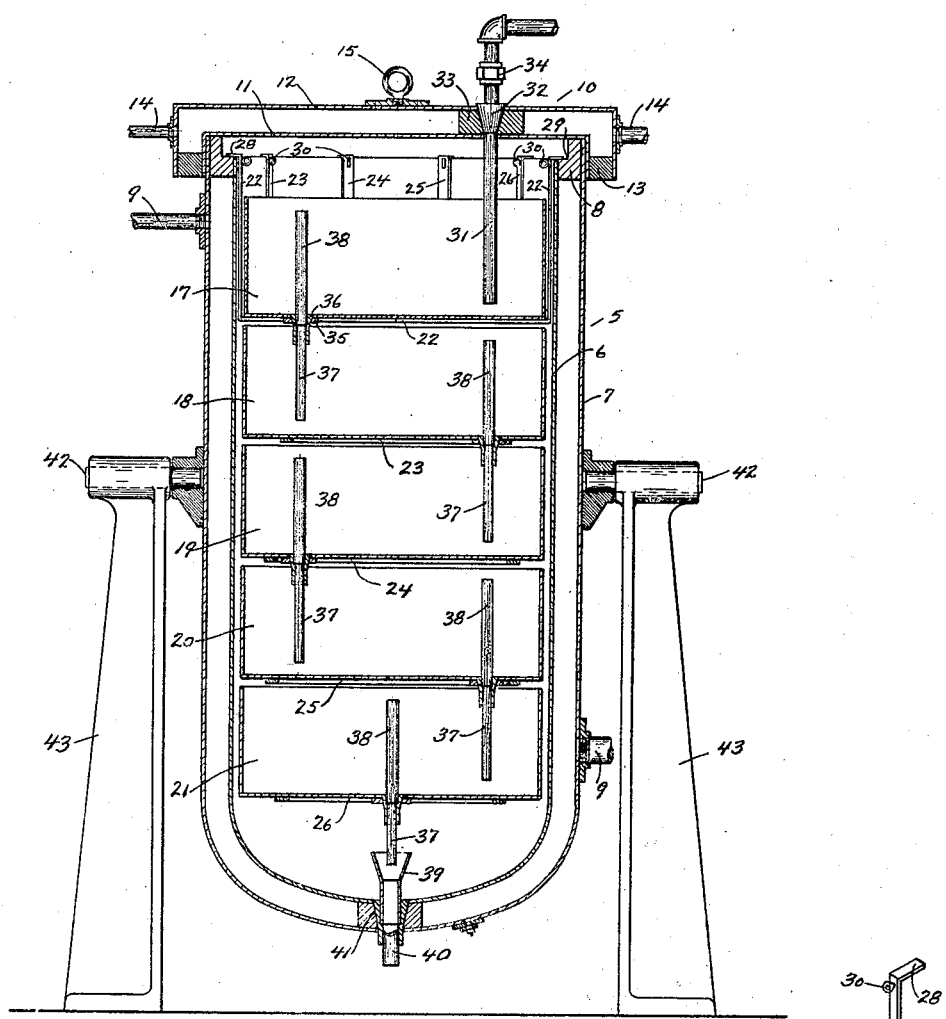
Figure 1 is a vertical, sectional elevation of my apparatus.
Figure 2:
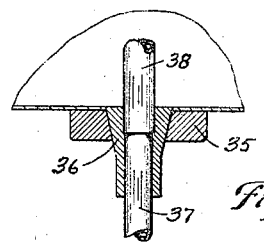
Fig. 2 is an enlarged, sectional view of one of the pipe connections of each pan.
Figure 3:
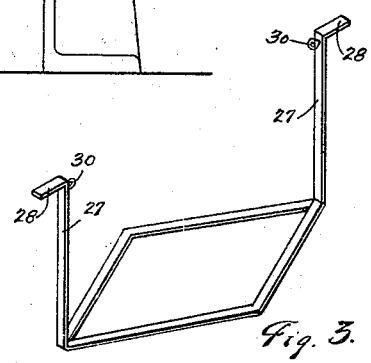
Fig. 3 is a perspective view of one of the pan racks.

My device comprises a jacketed casing 5, having inner and outer walls 6 and 7, respectively. A separator 8 is provided around the upper edge of the casing, and the inner and outer walls are secured to the separator by suitable means. The outer wall 7 is provided with pipe connections 9, whereby steam, hot water, or other heating medium may be passed through the space between the walls and the casing.

The casing 5 is provided with a cover 10 having inner and outer walls 11 and 12, respectively. These walls are united by suitable means to the separator ring 13. The cover is preferably provided with pipe connections 14, whereby it may be heated and with a ring 15 by which it may be conveniently raised from the casing.

Within the casing is provided a plurality of pans 17, 18, 19, 20 and 21. These pans are supported by racks 22, 23, 24, 25 and 26. The rack 23 is provided with arms 27, which are longer than the arms of the rack 22, and each successive rack has longer arms than the preceding one, whereby each pan is supported separately. The arms of each of these racks are provided at their upper ends with right-angled bends 28, which are arranged to rest upon a shoulder 29, formed on the inner periphery of the separator ring 8. Each rack is preferably provided with rings 30 or other suitable means, whereby they may be conveniently removed from the casing.

Passing through the cover 10 is a supply pipe 31 of the device. A tapered bushing 32 is provided on this pipe, which fits into a seat 33 provided in the space between the walls of the cover. This arrangement provides a joint which may be easily and quickly removed and cleaned. At the upper end of the pipe 31 is provided a pipe union 34, or other quickly detachable means, whereby this pipe may be connected with the source of supply of the fluid being pasteurized. Each of the pans is provided on its upper side, at a point preferably diametrically opposite the point of supply, with a reinforcement 35. This reinforcement is formed with a tapered aperture in which is arranged a tapered bushing 36. This bushing preferably extends up to the inner surface of the bottom of each pan and has secured to its under side a drain pipe 37, which is of sufficient length to extend to a point near the bottom of the pan below. Rising vertically from the bushing 36 is a stand pipe 38, which is detachably connected with the said bushing and extends upwardly to a point near the upper edge of each pan.

As shown in the drawings, these pipes are arranged so that the supply is at a point diametrically opposite the stand pipe. The pipe connection for the lower pan 21 is preferably at the center and so arranged that the drain pipe 37 will fit into a funnel 39. This funnel is preferably a part of the drain pipe 40, and is secured in the bottom of the casing 5, preferably by means of a taper joint 41.

The casing 5 may be mounted upon trunnions 42 arranged at points diametrically opposite. These trunnions are rotatably disposed within bearing brackets 43, whereby the casing may be suitably tilted for cleansing purposes.

It will be clearly seen that when milk, or other fluid to be pasteurized, is admitted through the pipe 31, that it will pass to a point near the bottom of the pan 17 and will then gradually rise until it reaches the top of the stand pipe 38 of said pan. At this point it will overflow and pass through this pipe and the drain pipe 37 secured below it, and into the pan 18 near the lower part thereof, whereupon it will again rise in the pan 18 until it has reached the top of the stand pipe 38 in this pan. The milk will thus continue to travel through the successive pans until it has been raised to the level of the stand pipe 38 in the lowermost pan 21. When it overflows into this pipe it will pass into the funnel 39 and drain pipe 40, whence it will be conveyed to any desired point.

It will thus be seen that during the operation of the device, the milk is being continuously passed from one pan to the other without permitting its elements to separate.

When it is desired to drain the liquid from the device, or to clean the same, the pipe union 34 is loosened and the cover 10 removed. The stand pipe 38 in the upper pan 17 is now withdrawn from the tapered bushing 36 and the milk in the pan 17 allowed to drain from this pan. The pan 17 with its rack 22 is then removed and the stand pipe 38 of the pan 18 withdrawn, whereupon the milk will be drained from this pan. This operation is continued until the fluid being treated has been drained from each pan.

It will be seen that each of the pipe connections used in this device is smooth, thus obviating the troubles resulting from threads and other connections having pockets for the lodgment of dirt.

Obviously, some modifications of the details herein shown and described may be made, without departing from the spirit of my invention, and I do not wish to be limited to the exact embodiment herein shown and described.

Having thus described my invention, what I claim is:

1. A pasteurizing apparatus comprising a casing, a cover for the casing, a plurality of separately removable pans, arranged one above the other within the casing, and detachable means secured to the bottom of each pan for conducting the fluid being treated from the pan after it has been substantially filled and for discharging the fluid into the next pan below at a point near its bottom.

2. A pasteurizing apparatus comprising a casing, a cover for the casing, a plurality of separately removable pans, arranged one above the other within the casing, detachable outlet means extending upwardly to a point near the top of each pan for conducting the fluid being treated from the pan after it has been substantially filled, and detachable means located in each pan for discharging the fluid into the next pan below at a point near its bottom.

3. A pasteurizing apparatus comprising a casing, a cover for the casing, a plurality of pans arranged one above the other within the casing, racks for holding the pans in their superimposed positions, a support near the top of the casing for carrying the racks, and means secured to the bottom of each pan for conducting the fluid being treated from the pan after it has been substantially filled and for discharging the fluid into the next pan below at a point near its bottom.

4. A pasteurizing apparatus comprising a casing, a cover for the casing, a plurality of separately removable pans, arranged one above the other within the casing, each pan being provided with a detachable stand pipe extending upwardly to a point near the top of the pan, and a drain pipe extending downwardly from the pan to a point near the bottom of the next pan below.

5. A pasteurizing apparatus comprising a casing, a cover for the casing a plurality of pans arranged one above the other within the casing, racks for holding the pans in their superimposed positions, a support near the top of the casing for carrying the racks, each pan being provided with a stand pipe extending upwardly to a point near the top of the pan and a drain pipe extending downwardly from the pan to a point near the bottom of the next pan below.

6. A pasteurizing apparatus comprising a casing, a cover for the casing, a plurality of separately removable pans arranged one above the other within the casing, each pan being provided on its bottom surface with a reinforcement having a tapered seat, a tapered bushing fitting into the seat, a stand pipe carried by the bushing and extending upwardly to a point near the top of the pan, and a drain pipe carried by the bushing and extending downwardly to a point near the bottom of the next pan below.

7. A pasteurizing apparatus comprising a casing, a cover for the casing, a plurality of separately removable pans arranged one above the other within the casing, detachable means secured to the bottom of each pan for draining the fluid from a point near its top, means for discharging the fluid being treated into the next pan below at a point near its bottom, and means for conveying the fluid after treatment, from the apparatus to any desired point through the casing.

In testimony whereof, I have hereunto signed my name in the presence of two subscribing witnesses.

HARRY E. COBURN.

Witnesses:
J. WM. ELLIS,
WALTER H. KELLEY.